United States Patent [19]

Gross

[11] Patent Number: 5,072,836

[45] Date of Patent: Dec. 17, 1991

[54] RACK FOR COMPACT DISKS OR TAPE CASSETTES

[76] Inventor: Jan S. Gross, 4903 San Jose St., Tampa, Fla. 33629

[21] Appl. No.: 637,778

[22] Filed: Jan. 7, 1991

[51] Int. Cl.⁵ .................................................. A47B 63/00
[52] U.S. Cl. .................................... 211/40; 211/182
[58] Field of Search ............... 211/40, 41, 88, 182; 40/124, 124.2, 124.4, 152, 605; 248/205.2

[56] References Cited

U.S. PATENT DOCUMENTS

| | | | |
|---|---|---|---|
| 118,380 | 8/1871 | Monroe | 40/124 X |
| 3,337,059 | 8/1967 | Le Hoy | 211/86 |
| 3,541,322 | 11/1970 | Bennett | 211/182 X |
| 3,773,183 | 11/1973 | Johnson | 211/71 |
| 3,908,830 | 9/1975 | Skrzelowski | 211/55 |
| 4,102,458 | 7/1978 | Fors | 211/40 X |
| 4,132,311 | 1/1979 | Glinert | 206/387 |
| 4,254,880 | 3/1981 | Mangel | 211/41 |
| 4,290,530 | 9/1981 | Wooster | 40/152 X |
| 4,403,697 | 9/1983 | Forshee | 211/13 |
| 4,477,990 | 10/1984 | Buchanan | 40/152 X |
| 4,497,125 | 2/1985 | Hutchinson | 40/124 X |
| 4,645,075 | 2/1987 | Van der Lely | 206/387 |
| 4,756,119 | 7/1988 | Chabot | 47/39 |
| 4,840,339 | 6/1989 | Grogan | 248/205.2 |
| 4,919,287 | 4/1990 | Haskett et al. | 211/41 |
| 4,940,147 | 7/1990 | Hunt | 248/205.2 X |
| 4,951,826 | 8/1990 | Tompkins | 248/205.2 X |
| 4,986,013 | 1/1991 | Pollack | 40/152 |

FOREIGN PATENT DOCUMENTS 2508301 12/1982 France .................................. 211/40

Primary Examiner—David M. Purol
Assistant Examiner—Sarah A. Lechok
Attorney, Agent, or Firm—James H. Beusse

[57] ABSTRACT

A wall mountable storage rack for compact disks comprises an open framework forming a plurality of adjacent rectangular receptacles, each being sized to accept a compact disk when the disk is oriented with one of the disk's largest surfaces facing outward of the rack. At least one releasable latch is integrated into each of the receptacles for releasably retaining a disk therein. Each of the rectangular receptacles is formed from four elongated side members releasably joined to four corner members. Preselected ones of the corner members are connectable to other elongated side members for forming the adjacent receptacles. The corner members also include a pin and socket arrangement on a rear surface for attaching a backing to an assembled rack. The rack may be wall mounted using Velcro type fasteners or the corner members may include pin holes formed therethrough for attaching the rack to a wall with small brads or pins.

9 Claims, 2 Drawing Sheets

RACK FOR COMPACT DISKS OR TAPE CASSETTES

The present invention relates to storage racks for music media cases and, more particularly, to storage racks which can be arranged for holding such media cases in a display arrangement with the largest surfaces of the cases facing outward.

BACKGROUND OF THE INVENTION

Music media, such as compact disks or magnetically encoded audio tapes, are generally packaged in a plastic case adapted to provide some degree of protection to the media. The cases are generally rectangular on all surfaces and have relatively thin edges. The predominate identification of the enclosed media appears on the larger surfaces of the cases rather than the narrower edges. For the relatively thin compact disks, the edge identification is both limited and relatively small due to the thickness of the disk and its case.

Notwithstanding the limited edge labeling of music media cases, it has been the general practice to provide storage racks which stack the cases in an edge viewable orientation. While such storage racks serve to reduce storage space for media cases, they also serve to increase the difficulty of identifying particular media selections and conceal the primary descriptive material on the larger surfaces of the media cases. It would be desirable to provide a music media storage rack which overcomes the above disadvantages of prior racks.

It is also common in the music industry to provide interesting and attractive faces on the media cases as part of the marketing of the underlying media. It is therefore further desirable to provide media storage racks which allow the cases of the media cases to be visible. Since such storage racks which display faces of music media may become relatively small depending upon the number of cases to be displayed, it is also desirable to provide a storage rack which can be adjusted to any selectable size by adding or deleting storage space.

SUMMARY OF THE INVENTION

The above and other objects, features, and advantages are in part apparent and in part illustrated in the disclosed embodiment. In general, the present invention comprises an apparatus for storage of music media cases such that a large face of each case is visible. In an illustrative form, the apparatus comprises a storage rack formed from a plurality of elongated members joined together by a plurality of corner members. The corner members may comprise a right angle corner, a T-shaped double corner, or a cross-shaped quadruple corner. The right angle corner forms a corner termination, the T-shaped double corner is used at an edge termination while the cross-shaped corner forms an interior corner for four adjacent storage receptacles. The elongated members are releasably connectable at each end thereof to one of the above described corner members. Four elongated members are connectable with four corners to form a single receptacle for receiving a media case. The size or length of the elongated member is selected to match the type of media to be stored, e.g., compact disk or magnetic tape. A particular corner member is selected depending upon whether the storage rack is to be extended to additional receptacles or terminated.

The storage rack may be formed of multiple receptacles arranged in a selected manner to form various shaped racks, for example, rectangular, L-shaped, T-shaped, cross-shaped, or U-shaped. The assembled rack may be hung on a wall or joined at an edge with another angularly oriented rack to become self-supporting. In a preferred form, the elongated members are provided with pins which snap into mating apertures in the corner members. The corner members and elongated members are suitably shaped to provide a continuous smooth edge around each receptacle when in an assembled condition. Each of the corner members includes an integral formed latching means for releasably holding a media case inserted into a corresponding receptacle. Each corner member is also formed with a flange to prevent the media case from being pressed out the back side of the formed receptacles.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
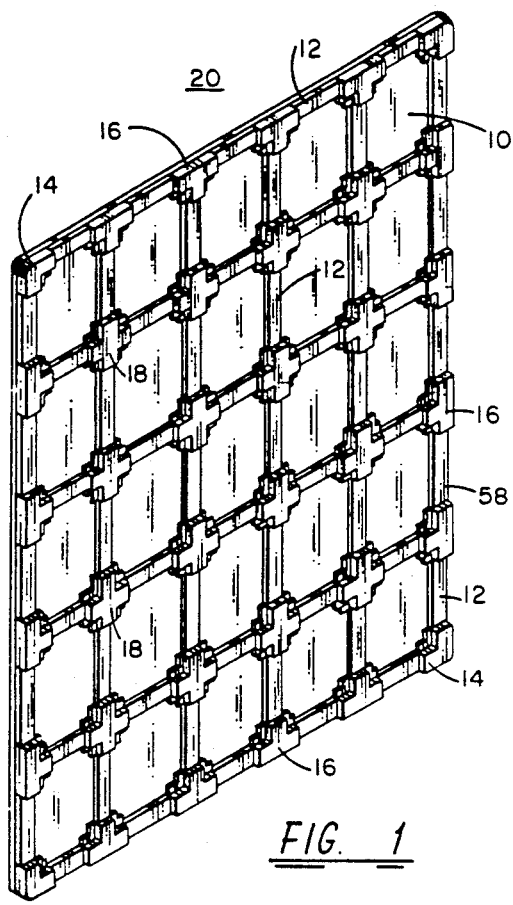
FIGS. 1 and 2 are alternate arrangements of a storage rack in accordance with the present invention.
Figure 2:
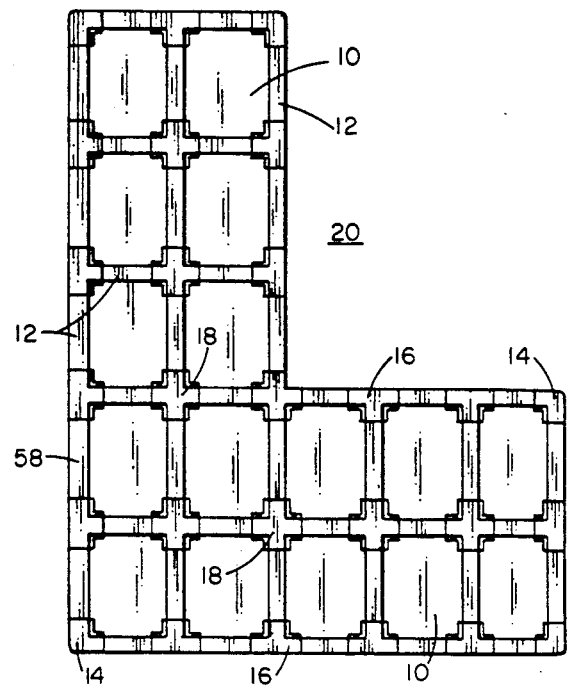

Referring now to FIGS. 1 and 2, there are shown two arrangements of the apparatus of the present invention for storage of music media such as, for example, compact disks or CD's. FIG. 1 illustrates a rectangular arrangement of receptacles 10 while FIG. 2 represents an L-shaped arrangement of receptacles 10. Each receptacle 10 is defined by four elongated members 12 releasably coupled together by four corner members, such as, for example, corner members 14 and 18, and two corner members 16 in the upper left hand receptacle of FIG. 1. Corner members comprising a right angle or L-shape are designated 14 throughout this description, corner members comprising a T-shape are designated 16 while corner members comprising a cross-shape are designated 18. Only these three corner member shapes are needed to construct various different arrangements of storage racks 20, such as the illustrated rectangular and L-shaped arrangements. It will be appreciated that the three corner members also allow construction of U-shaped, T-shaped, and cross-shaped racks as well as other shapes. The assembled racks may also include a backing sheet or poster which can provide filler material for empty receptacles. The manner of attaching such backing sheets will be explained hereinafter.

Figure 3A:
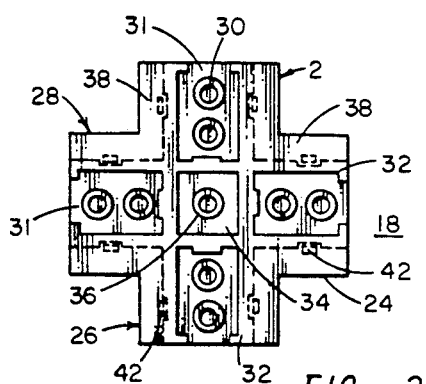
FIGS. 3A, 3B, and 3C are bottom, top, and edge views of one form of corner member for assembling the racks of FIGS. 1 and 2.
Figure 3B:
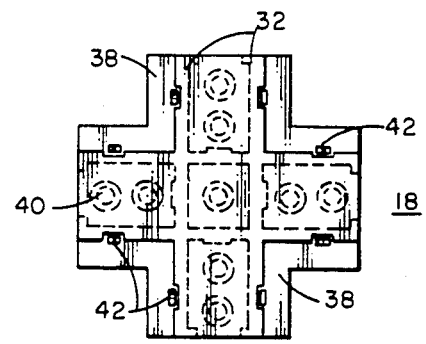
Figure 3C:
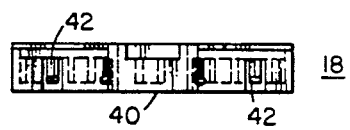

Turning to FIGS. 3A, 3B, and 3C, there are shown bottom, top, and edge views, respectively, of one of the corner members 18. It will be appreciated that the corner members 14 and 16 are modifications of the member 18. In particular, corner member 14 is essentially formed by deleting the two arms 22 and 24 from member 18 while corner member 16 can be formed by deleting only the arm 22. Each of the arms 22, 24, 26, and 28 of member 18 includes a pair of hollow, cylindrical studs 30 recessed within a hollowed out portion 31 of each arm. Walls 32 extending along each edge of each arm 22-28 also extend through the mid-portion of each corner member and thereby define a further hollowed out center portion 34. Another hollow, cylindrical stud 36 is formed within the portion 34. The stud 36 is provided for receiving a mating pin (see FIG. 8) which can be used to attach a backing or poster to the assembled storage rack.

Each of the walls 32 are formed integrally with outwardly extending flanges 38. The height of the walls 32 above the flanges 38 (see FIGS. 3B and 3C) is such as to allow a media case, such as a CD case, to be placed in one of the receptacles 10 with a bottom surface of the case resting against the flange 38 while the top or outer surface of the media case is slightly below the outer surface 40 of member 18 so that releasable latching means 42 are effective to engage the media case and restrain it within the receptacle 10. While the latching means 42 are shown as comprising two members at each corner of a media case, it will be appreciated that fewer means 42 could be used. The latching means 42 preferably are formed integrally with the corner members and in the preferred form of injection molding of the members 22-28 from plastic, the spring-like latching means 42 are molded in situ with the corner members in a manner well known in the art.

Figure 4A:
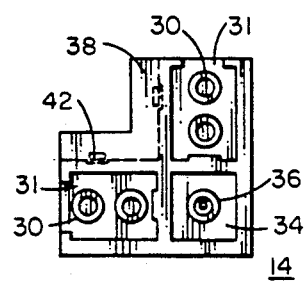
FIGS. 4A, 4B, and 4C are bottom, top, and edge views of another form of corner member.
Figure 4B:
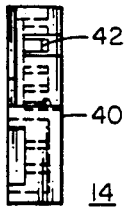
Figure 4C:
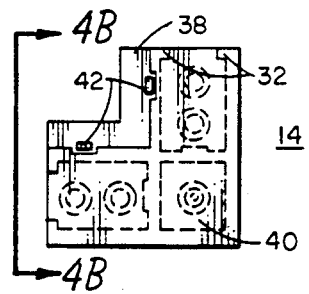
Figure 5A:
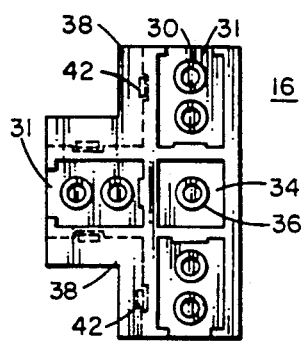
FIGS. 5A and 5B are bottom and top views of still another form of corner member.
Figure 5B:
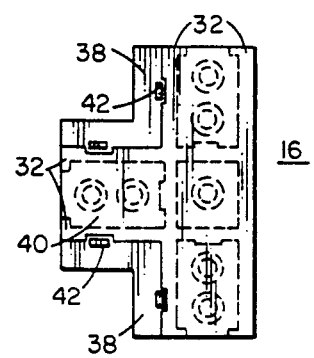

Turning now to FIGS. 4A, 4B, and 4C, there are shown bottom, edge, and top views, respectively, of a corner member 14. It will be seen that the general structure of member 14 is the same as member 18. The primary difference is in the removal of two of the arms of the member 18 so that corner member 14 forms a right-angle terminating corner. The flange segments 38 are preferably omitted from the outer portion of the member 14 since they are not needed for supporting a media case. FIGS. 5A and 5B are bottom and top views of the corner member 16 and also show the commonality of part structure with member 18.

Figure 6A:
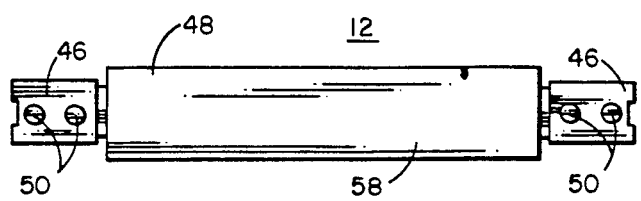
FIGS. 6A, 6B, and 6C are top, edge, and bottom views of an elongated member for joining the corner members.
Figure 6B:
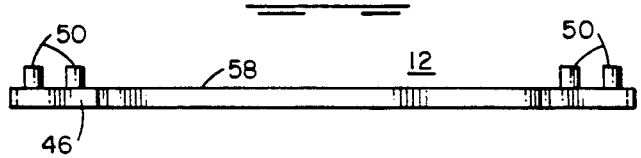
Figure 6C:
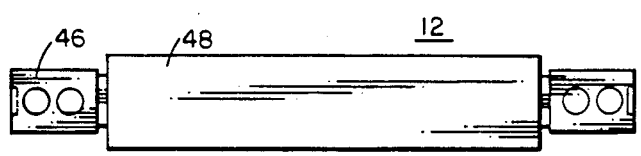

Referring now to FIGS. 6A, 6B, and 6C, there are shown top, edge, and bottom views, respectively, of the elongated members 12. Each member 12 has an end section 46 at each end thereof which fits relatively snugly within the hollowed out portion 31 of each corner member 14, 16, and 18. The major extent 48 of each member 12 is larger than an end section 46 and is sized to mate with and form a continuous surface with walls 32 of each corner member. Each end section 46 also includes a pair of spaced pins 50 adapted for press fit insertion into studs 30 to thereby releasably attach elongated members 12 to selected arms of a corner member for forming receptacles 10.

Figure 7:
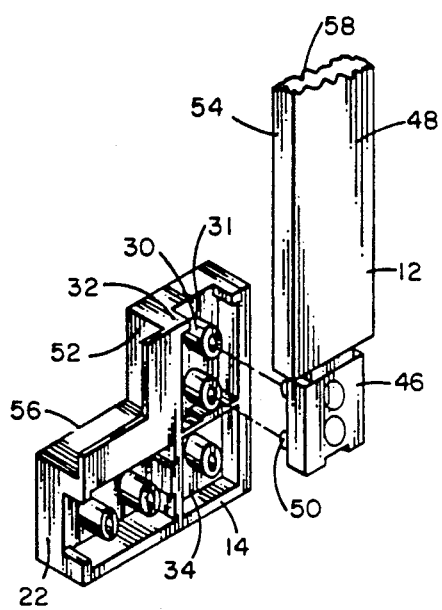
FIG. 7 is an exploded view of a corner joint.

FIG. 7 is an exploded view of a corner member 14 and one end 46 of an elongated member 12. The two members are assembled by pressing end section 46 of member 12 into the hollowed out portion 31 of corner member 14 such that pins 50 are pressed into studs 30. In their assembled orientation, the edge 52 of wall 32 forms a continuous surface with edge 54 of portion 48 of member 12. Similarly, the outer surface 56 of arm 22 forms a continuous surface with outer surface 58 of portion 48. When assembled, the center portion 34 of each corner member remains exposed toward the rear of the storage rack so that the aforementioned pins can be inserted in studs 36.

Figure 8:
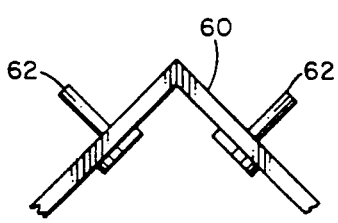
FIG. 8 illustrates apparatus for joining multiple storage racks.

FIG. 8 illustrates a right angle connector 60 which can be used to join two assembled storage racks 20 so that they become stable and stand-alone devices. The pins 62 are representative of pins for insertion in studs 36 for joining two or more racks.

In some usage, it is anticipated that the storage racks 20 may be utilized as wall hangings, particularly when the racks are used for CD storage.

What has been described is a storage rack assembly for music media which may be supplied as a kit of corner members and elongated members for assembly by a consumer in any of multiple configurations and sizes. While one form of releasable connection has been illustrated for joining the elongated members to the corner members, other forms will become apparent to those skilled in the art. Furthermore, the members forming each receptacle may be molded in other configurations, such as, for example, as individual or multiple receptacles 10 adapted for joining with other receptacles. The rack may be wall mounted using Velcro type fasteners or the corner members may include pin holes formed therethrough for attaching the rack to a wall with small brads or pins. It is intended therefore that the invention not be limited to the illustrative embodiment but be interpreted within the full spirit and scope of the appended claims.

What is claimed is:

1. A wall mountable storage rack for compact disk cases comprising an open framework forming a plurality of adjacent rectangular receptacles being sized to accept a compact disk case when the case is oriented with one of the disk case's largest surfaces facing outward of the rack, each of the rectangular receptacles being formed from four elongated side members releasably joined to four corner members, preselected ones of the corner members being connectable to other elongated side members for forming the adjacent receptacles;

each of said corner members including a flange adjacent a rear edge thereof, said flange extending a preselected distance into a receptacle defined in part by a corresponding one of said corner members, said flange engaging a rear surface of a compact disk case when the disk case is inserted into a receptacle for positioning an outwardly facing surface of the case in a preselected orientation with respect to an outwardly facing surface of the storage rack; and at least one releasable latch in each of the receptacles for releasably retaining a disk case within the receptacle in an abutting position against said flange, said at least one latch comprising a spring member positioned between an edge of a respective one of the disk cases and one of said corner and side members for urging the case toward an opposite side member, said spring member having an end urged into overlapping a portion of the outwardly facing surface of the disk case when the case is seated against said flange.

2. The storage rack of claim 1 and including releasable latch means on each side of each of the receptacles.

3. Apparatus for forming a storage rack for music media cases comprising a plurality of elongated members and a plurality of corner members, each end of each of the elongated members being releasably connectable to one of the corner members for forming a plurality of adjacent rectangular receptacles for receiving the media cases, at least one of the corner members having a cross-shaped configuration forming a joining member for four adjacent receptacles, at least some of the corner members having a T-shaped configuration forming a joining member for a pair of adjacent receptacles, the elongated members having preselected lengths for establishing preselected sizes of receptacles corresponding to sizes of media cases to be displayed in the rack, the receptacles being formed so as to establish a generally planar rack for displaying the media cases with a larger surface of the cases facing outward of the rack, each of the corner members including a flange portion extending into a corresponding receptacle for supporting a rear surface of a respective media case, and spring members coupled to each of the corner members for urging a corresponding media case into a seating position against a corresponding one of the flange portions.

4. The apparatus of claim 3 and wherein the spring members comprise latch means formed integrally with each of the corner members for releasably retaining the media cases in the storage rack.

5. The apparatus of claim 3 wherein each of said corner members includes a hollow, generally cylindrical stud formed therein for passing a pin therethrough for attaching the rack to a vertical surface.

6. The apparatus of claim 5 wherein the stud in each corner member is adapted to receive a mating pin from a rear surface of the rack for supporting a poster to the rear surface of the rack.

7. The apparatus of claim 3 wherein each arm of each corner member includes at least a pair of hollow, cylindrical studs recessed within a hollowed-out portion of each arm and facing rearwardly thereof, each of the elongated members including an end portion adapted to fit within the hollowed-out portion of a respective one of the arms and further including a pair of pins for matingly engaging the pair of studs for attaching the elongated members to the corner members when the end portion is pressed into the hollowed-out portion.

8. The apparatus of claim 3 and including:
   means for coupling at least two of said racks together to form a free-standing unit, said coupling means comprising an angular connector having a pair of opposite ends adapted for connection to selected ones of said corner members on adjacently positioned ones of said racks for releasably coupling said racks to each other.

9. The apparatus of claim 8 wherein said opposite ends of said coupling means are oriented perpendicularly to each other for coupling said racks at generally perpendicular orientations.

* * * * *